(12) United States Patent
He et al.

(10) Patent No.: US 8,960,769 B2
(45) Date of Patent: Feb. 24, 2015

(54) FAIRING FOR A TRUCK CAB-TRAILER GAP

(75) Inventors: Wei He, Colfax, NC (US); Mathew Frederick Heinecke, Kernersville, NC (US)

(73) Assignee: Volvo Group North America, LLC, Greensboro, NC (US)

( * ) Notice: Subject to any disclaimer, the term of this patent is extended or adjusted under 35 U.S.C. 154(b) by 0 days.

(21) Appl. No.: 14/348,087

(22) PCT Filed: Oct. 12, 2011

(86) PCT No.: PCT/US2011/055930
§ 371 (c)(1),
(2), (4) Date: Mar. 28, 2014

(87) PCT Pub. No.: WO2013/055325
PCT Pub. Date: Apr. 18, 2013

(65) Prior Publication Data
US 2014/0232133 A1 Aug. 21, 2014

(51) Int. Cl.
*B62D 35/00* (2006.01)
(52) U.S. Cl.
CPC .................................... *B62D 35/001* (2013.01)
USPC ...................................................... 296/180.2
(58) Field of Classification Search
CPC .............................. B62D 35/00; B62D 35/001
USPC .................................. 296/180.1, 180.2, 180.4
See application file for complete search history.

(56) References Cited

U.S. PATENT DOCUMENTS

| | | | | |
|---|---|---|---|---|
| 2,038,265 A * | 4/1936 | Bradley | ...................... | 280/423.1 |
| 3,722,918 A * | 3/1973 | Conner | .......................... | 280/432 |
| 3,834,752 A | 9/1974 | Cook et al. | | |
| 3,878,914 A * | 4/1975 | Gulich et al. | ............... | 180/89.19 |
| 3,945,677 A | 3/1976 | Servais et al. | | |
| 4,311,334 A | 1/1982 | Jenkins | | |
| 4,904,015 A | 2/1990 | Haines | | |
| 4,938,524 A * | 7/1990 | Straub et al. | ................ | 296/184.1 |
| 5,078,448 A * | 1/1992 | Selzer et al. | ................ | 296/180.2 |
| 5,762,374 A * | 6/1998 | Grove et al. | ................... | 280/847 |
| 5,788,321 A | 8/1998 | McHorse et al. | | |
| 6,079,769 A * | 6/2000 | Fannin et al. | ............... | 296/180.1 |
| 6,267,434 B1 | 7/2001 | Casillas | | |
| 6,846,035 B2 * | 1/2005 | Wong et al. | ................ | 296/180.1 |
| 7,073,845 B2 * | 7/2006 | Ortega et al. | ............... | 296/180.3 |
| 7,216,923 B2 * | 5/2007 | Wong et al. | ................ | 296/180.2 |
| 8,075,046 B2 * | 12/2011 | Pursley | ....................... | 296/180.2 |
| 8,419,109 B2 * | 4/2013 | Pickering | .................... | 296/180.2 |
| 8,746,779 B1 * | 6/2014 | Mazyan | ...................... | 296/180.2 |
| 2002/0053813 A1 * | 5/2002 | Wilde | ......................... | 296/180.1 |
| 2003/0047906 A1 * | 3/2003 | Hicks et al. | ................... | 280/433 |
| 2009/0044991 A1 | 2/2009 | Bullis | | |

(Continued)

OTHER PUBLICATIONS

International Search Report and Written Opinion of corresponding PCT/US2011/055930.

*Primary Examiner* — Gregory Blankenship
(74) *Attorney, Agent, or Firm* — Martin Farrell; Michael Pruden

(57) ABSTRACT

A truck for pulling a semi-trailer includes an operator cab positioned on a frame and a fifth wheel mounted on the frame for receiving an underside of the semi-trailer. The trailer when attached to the truck defines a gap between a forward most portion of the semi-trailer and rearward most portion of the operator cab. A fairing can be located on the frame, aft of the operator cab and forward of at least a portion of the fifth wheel. The fairing can block at least a portion of the air flow attempting to enter the gap from below the frame.

15 Claims, 8 Drawing Sheets

(56) References Cited

U.S. PATENT DOCUMENTS

| | | | |
|---|---|---|---|
| 2009/0212595 A1* | 8/2009 | Heppel et al. | 296/180.4 |
| 2014/0117712 A1* | 5/2014 | Butler et al. | 296/180.2 |
| 2014/0232133 A1* | 8/2014 | He et al. | 296/180.2 |
| 2014/0238761 A1* | 8/2014 | He et al. | 180/89.12 |

* cited by examiner

FAIRING FOR A TRUCK CAB-TRAILER GAP

FIELD OF THE INVENTION

The present invention relates to a fairing for blocking air flow in the cab-trailer gap of a tractor-trailer vehicle.

BACKGROUND OF THE INVENTION

Ever increasing fuel costs continue to encourage rigid and semi-trailer tractor designers to search for additional, novel ways to improve vehicle fuel economy. Negative effects caused by air flow during travel are a frequent area of focus. Several measures have been taken by manufacturers to reduce aerodynamic drag by altering external shapes to minimize the restraining force that acts on any moving body in the direction of the freestream flow. Solutions such as fairings, deflectors, foils, sloping hoods, rolled-under bumpers, and recessed door handles can add design costs and weight, and complicate vehicle repair and servicing. Nevertheless, a designer's goal is to offset these negative effects with an overall reduction of the drag coefficient such that vehicle fuel economy can increase.

To continue to improve fuel economy, there remains a need to search for novel ways to minimize negative effects caused by air flow, while continuing to consider and offset negative impacts of such design changes and additional components.

SUMMARY OF THE INVENTION

The following presents a simplified summary of the invention in order to provide a basic understanding of some aspects of the invention. This summary is not an extensive overview of the invention and is not intended to identify key or critical elements of the invention or to delineate the scope of the invention. The purpose of this section is to present some concepts of the invention in a simplified form as a prelude to the more detailed description that is presented later.

A truck for pulling a semi-trailer has an operator cab positioned on a frame. A fifth wheel is on the frame for receiving an underside of the semi-trailer. The semi-trailer when attached to the truck defines a gap between a forward most portion of the semi-trailer and rearward most portion of the operator cab. A fairing can be located on the frame, aft of the operator cab and forward of at least a portion of the fifth wheel. The fairing can block at least a portion of the air flow attempting to enter the gap from below the frame.

DETAILED DESCRIPTION

Certain exemplary embodiments of the present invention are described below and illustrated in the accompanying figures. The embodiments described are only for purposes of illustrating the present invention and should not be interpreted as limiting the scope of the invention, which, of course, is limited only by the claims below. Other embodiments of the invention, and certain modifications and improvements of the described embodiments, will occur to those skilled in the art and all such alternative embodiments, modifications, and improvements are within the scope of the present invention.

Figure 1:
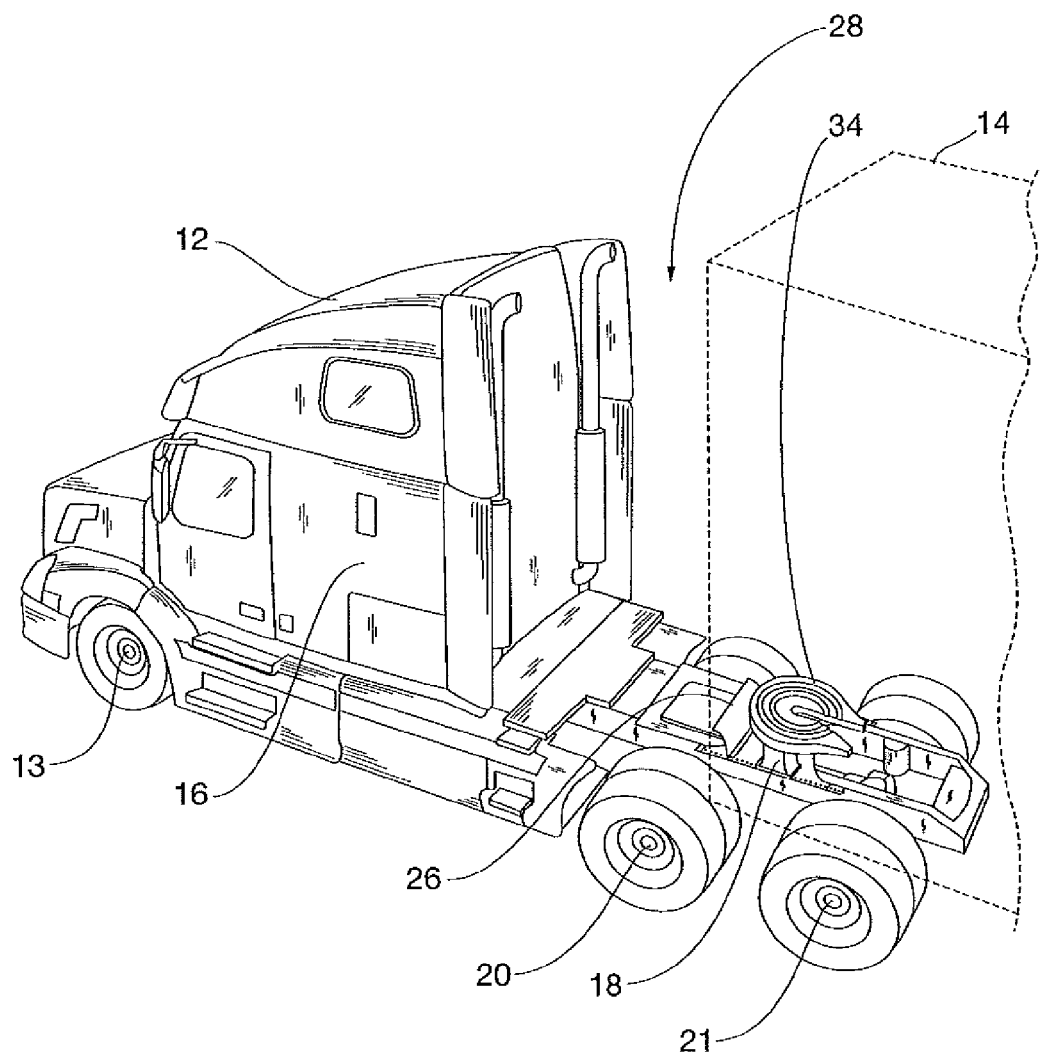
FIG. 1 is a perspective view of the tractor-trailer vehicle and fairing according to a first embodiment of the invention.

FIG. 1 shows a truck tractor or truck 12 and semi-trailer 14. The semi-trailer 14 is shown in dashed lines for display purposes. The truck 12 includes an operator cab 16 positioned on a chassis frame 18. A steer axle 13 is at the front of the truck 12, which is forward of one or two drive axles. In the embodiment shown in FIG. 1, two drive axles 20 and 21 are shown, forming a 6×4 axle configuration as is known in the art. A fifth wheel 34 mounted on the chassis frame 18 receives the semi-trailer 14. The area behind or aft of the operator cab 16 but forward of the semi-trailer 14 is a cab-trailer gap or simply gap 28. While a dual drive axle design is shown, the invention as described herein can be used on single drive axle designs also.

The inventors have discovered that during truck movement, air flow can enter the gap 28 from the underbody of the truck 12, and cause negative effects upon fuel economy. This air flow is created through the creation of eddies, leading to the swirling of reverse air currents created as the air flow passes underneath the chassis frame 18 and the rearward most driving axle 21. This reverse flow of air leads to increased turbulence in this region, and can lead to increased aerodynamic drag. To minimize these negative effects of this reverse flow, a fairing 26 can be positioned forward of the fifth wheel 34 and rearward of the operator cab 16 to block a substantial portion of the air flow from entering the cab-trailer gap 28.

Figure 2:
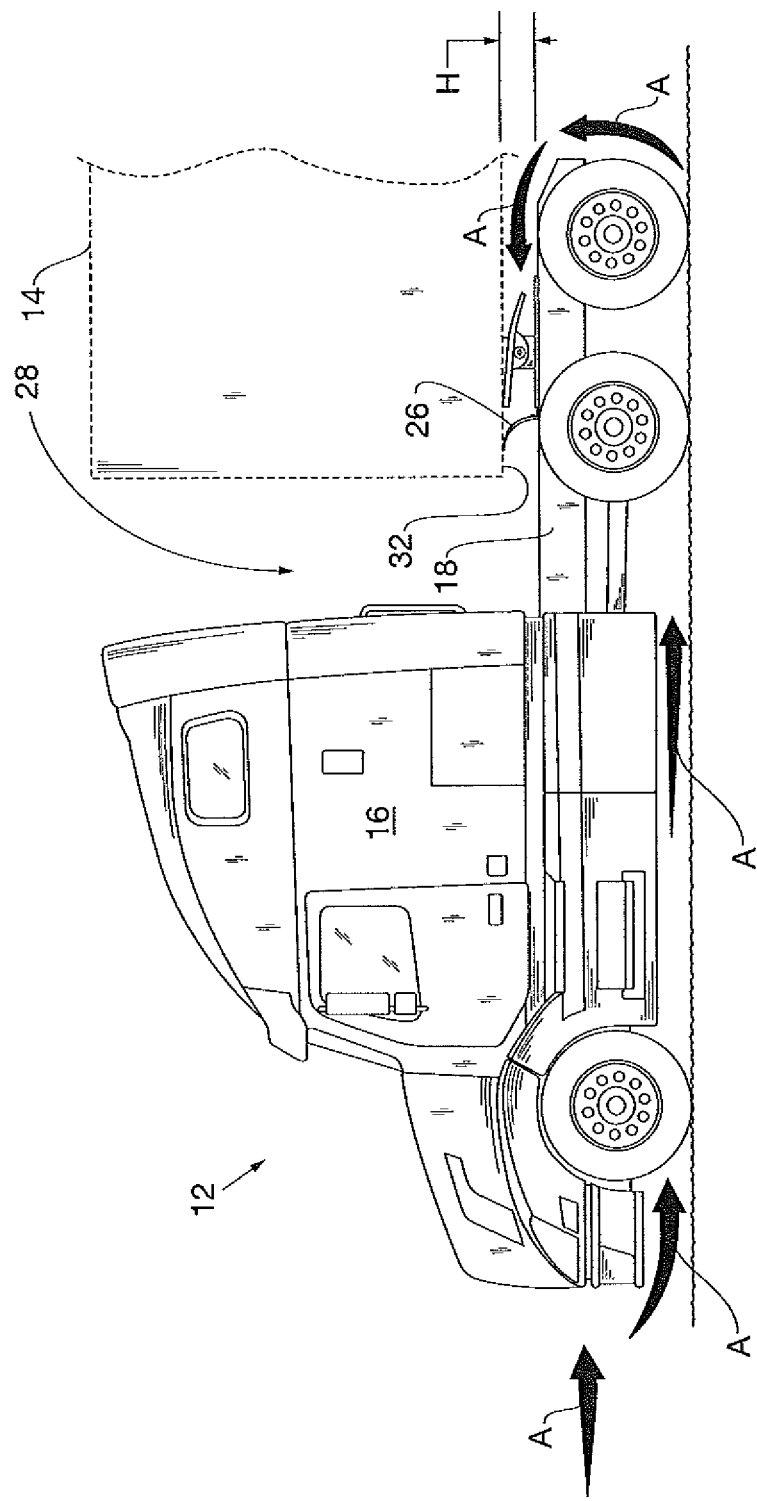
FIG. 2 is a side elevation view of the tractor-trailer vehicle and fairing shown in FIG. 1.
Figure 3:
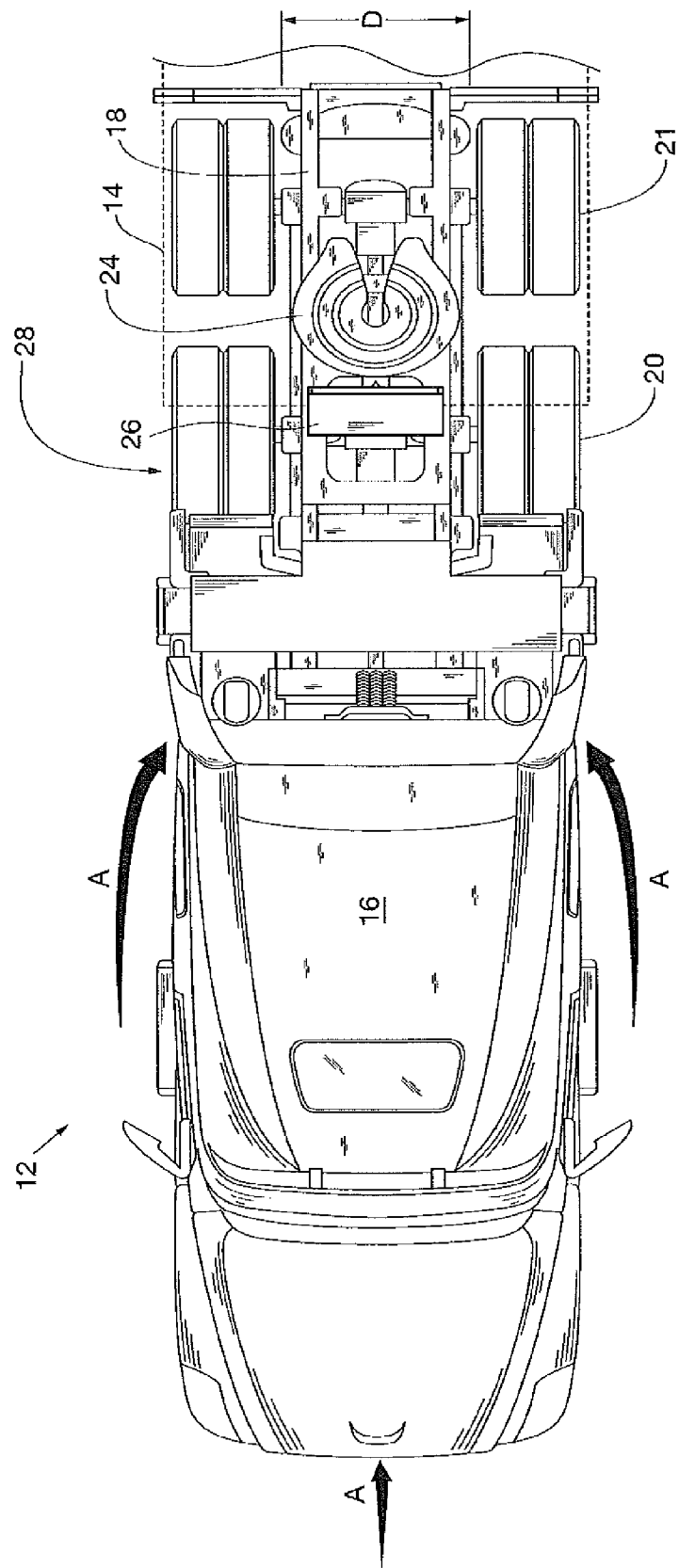
FIG. 3 is a top view of the tractor-trailer vehicle and fairing shown in FIG. 1.

FIGS. 2 and 3 are a side view and top view, respectively, illustrating the manner in which the fairing 26 can partially block the air flow path into the cab-trailer gap 28. Fairing 26 can be positioned forward (as shown in FIGS. 2 and 3) or rearward of the fifth wheel 34, to partially block the air flow (shown with directional arrow A) from entering the cab-trailer gap 28 from beneath the truck 12. As shown, air flow A can enter the truck underside from the front or sides of the truck. As shown in FIG. 2, H refers to the height from the top of the chassis 18 to the semi-trailer underside 32. In one embodiment, the fairing 26 can extend up to and contact the trailer underside 32. As shown in FIG. 3, the fairing 26 can span all or at least a portion of a distance D between the interior wheels of the rear drive axles 20, 21. The height H and the distance D define and represent an opening, an air flow path into the gap 28, that the instant invention is intended to substantially block.

Figure 4:
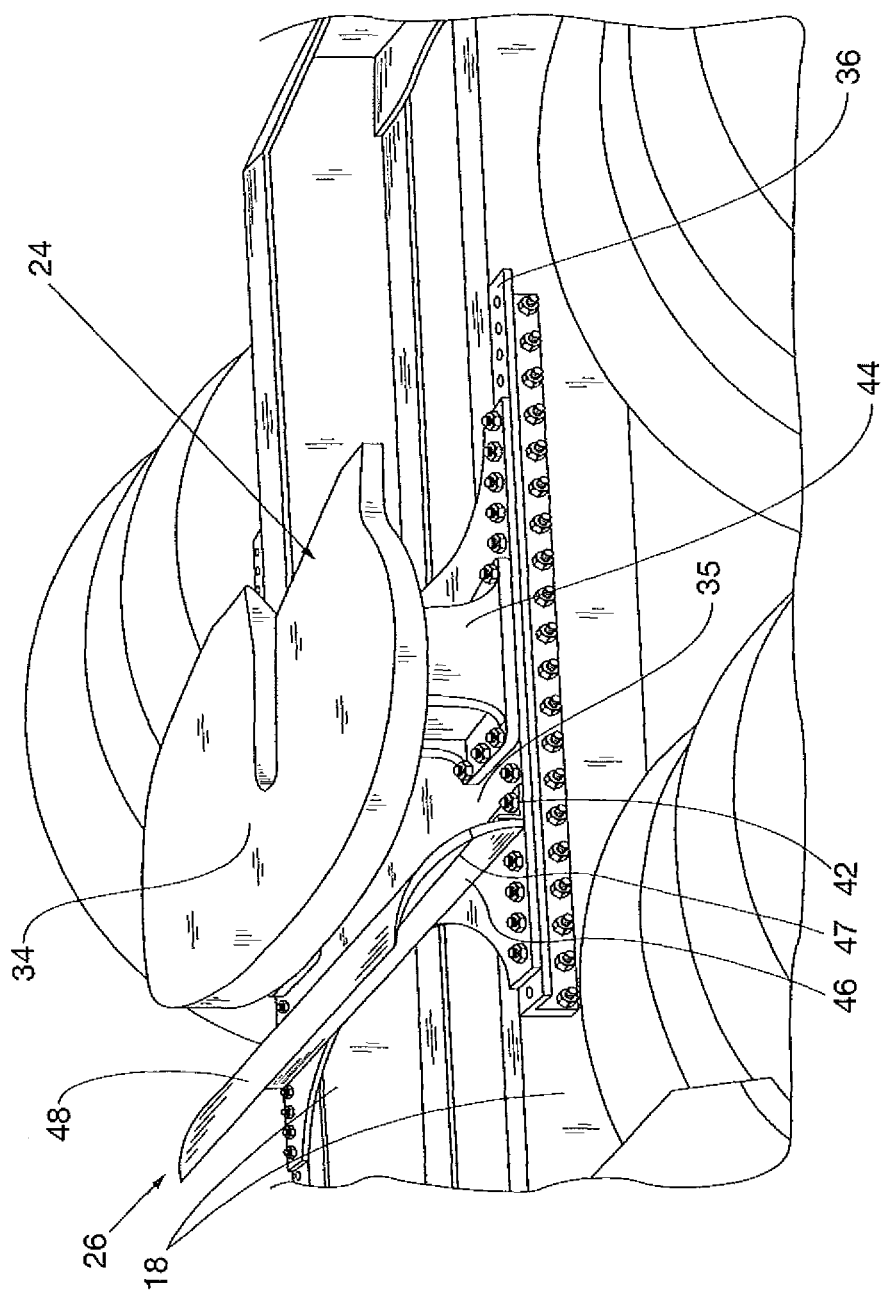
FIG. 4 is a partial perspective view of the tractor-trailer vehicle and fairing shown in FIG. 1.

FIG. 4 shows a manner of attaching the fairing 26 to the chassis frame 18. A fifth wheel assembly 24 can comprise the fifth wheel 34, a fifth wheel base 44, an attachment plate 35, and an L-shaped profile 36. The L-shaped profile 36 is attached to the chassis frame 18 in conventional ways, e.g., welded or through fasteners. The fifth wheel 34 secures the semi-trailer 14 to the truck 12 as is known in the art. Fairing 26 can be secured to the L-shaped profile 36 at any desired location along the frame. Alternatively, the fairing 26 can be mounted directly to the chassis frame 18. In the embodiment of FIG. 4, a base 46 of the fairing is attached to the L-shaped profile 36 through the use of L-brackets 42. The fairing 26 rises upwards therefrom to an upper compliant portion 48. The compliant portion 48 is proximate to the top edge of the fairing 26. A transition 47 can separate the base 46 from the compliant portion 48. The height H from the top of the chassis frame 18 to the underside 32 of the semi-trailer 14 can vary based upon various conditions, for example, relative pitch motion between the truck and the trailer as when moving from the road onto a driveway. The fairing 26 preferably has some means to bias the fairing 26 upwards towards the underside 32 of the semi-trailer 14 so that the fairing 26 will in most situations contact the underside 32 and so that the space between the chassis to the semi-trailer underside will be effectively closed. This biasing can be accomplished by the structures and their equivalents described herein.

Figure 5:
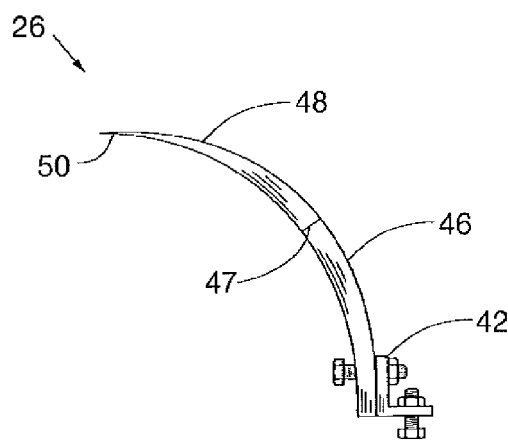
FIG. 5 is a side view of the fairing shown in FIGS. 1-4.

FIG. 5 is a side view of the fairing 26 of a preferred embodiment as shown in FIGS. 1-4. Fairing 26 includes a fairing base 46, a compliant portion 48, and a transition 47 there between. The L-bracket 42 attached to the fairing base 46 can be used to secure the fairing 26 to the fifth wheel assembly 24 as described above. Conventional fasteners or welds can be used. The top edge 50, which forms part of the compliant portion 48, can extend to and contact the semi-trailer underside 32. In this manner, the fairing 26 can flex as the semi-trailer 14 moves during use. For example, when the semi-trailer 14 is secured to the truck 12, the semi-trailer underside 32 can move closer to or further from the chassis frame 18 during turns or when the vehicle travels over abrupt changes in road elevation, e.g., railroad crossings. Thus, when the semi-trailer contacts the fairing 26, the compliant portion 48 can flex and then return to its installed shape to block the air flow as described herein. The fairing base 46 can be a more rigid structure than the compliant portion 48. The fairing base 46 provides some stability to the fairing 26 in addition to providing suitable attachment points for the brackets 42. The fairing base 46 can be aluminum, stainless steel, a rigid composite, or a rigid polymeric panel. The compliant portion 48 can be a flexible reinforced composite, polymeric molded panel, brushes or bristles, a rubber strip, laminate or any other compliant material. In alternative embodiments, the entire fairing 26 can be compliant. In other embodiments, the fairing 26 can be formed of one or more panels connected together in an end to end configuration, or laminated together across their respective surface areas.

The fairing 26 of FIG. 5 has a curvilinear profile in cross section, which in this embodiment is concave in the forward directed surface and convex on the surface that faces the fifth wheel (as shown in FIG. 4). The curvilinear profile of fairing 26 also facilitates compliance of the top edge 50 and the biasing of the fairing towards the semi-trailer underside 32.

Figure 6:
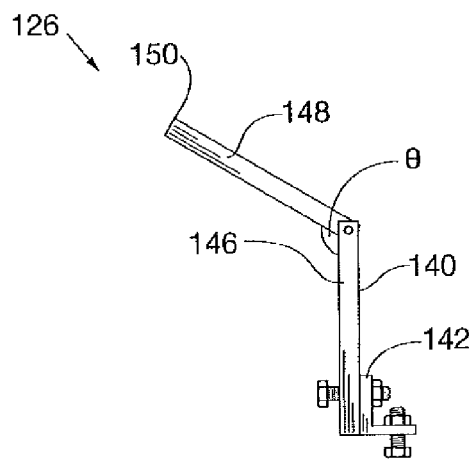
FIG. 6 is a side view of a fairing according to a second embodiment.
Figure 7:
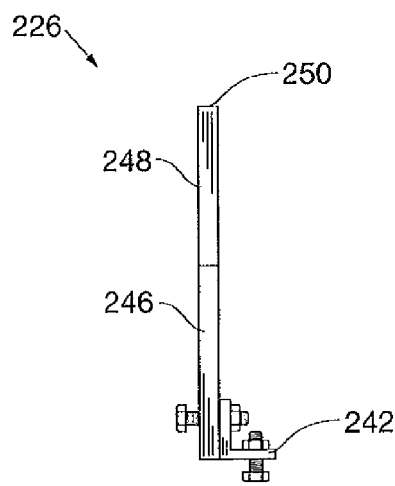
FIG. 7 is a side view of a fairing according to a third embodiment.

Alternative fairing shapes are shown in FIGS. 6 and 7. As shown in FIG. 6, a second embodiment has a fairing 126 with similar components to the fairing 26 described above and shown in FIG. 5. The fairing 126 also has a fairing base 146 and a compliant portion 148.

The compliant portion 148 extends above and toward the semi-trailer underside 32. The compliant portion 148 can form an angle θ, with respect to the fairing base 146. In a preferred embodiment, angle θ shown in FIG. 6 is an obtuse angle. FIG. 7 shows a third embodiment of a fairing 226 having a generally straight profile. The fairing extends perpendicularly up from the fifth wheel assembly 24 (shown in FIG. 4) toward the truck underside 32. The embodiments shown in FIGS. 6 and 7 include fairing bases 146, 246 secured to the fifth wheel assembly 24 using L-brackets 142, 242. The top edges 150, 250 are proximate the semi-trailer underside 32, and form at least part of the compliant portions 148, 248.

Figure 8:
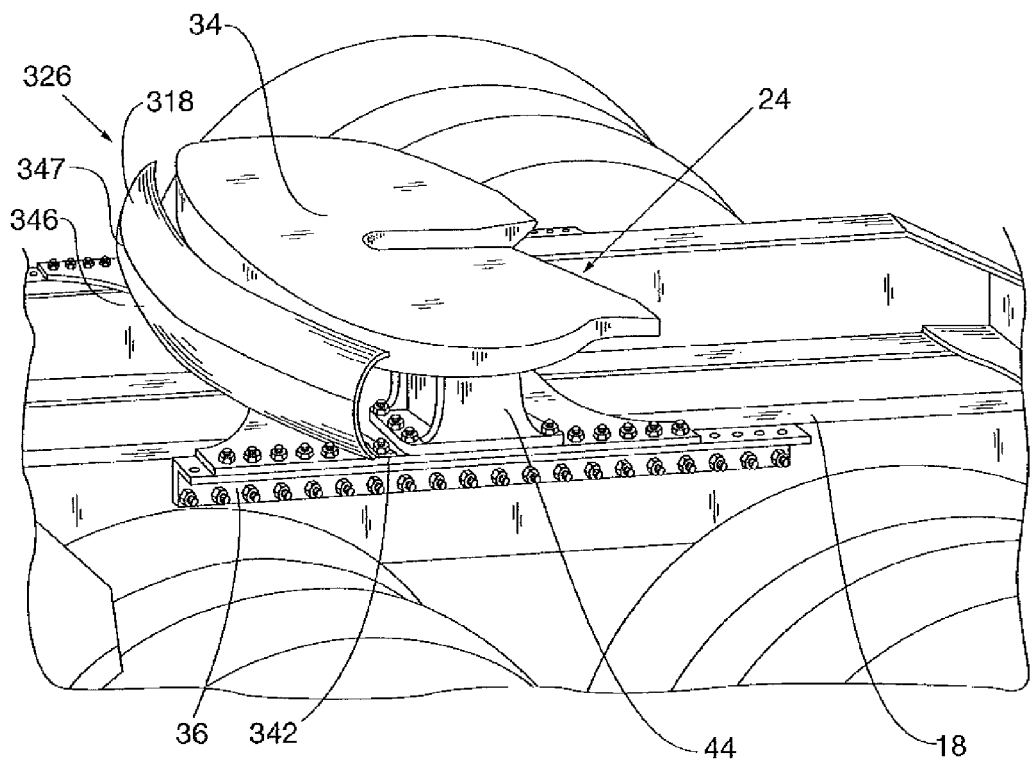
FIG. 8 is a partial perspective view of a fairing according to a fourth embodiment.
Figure 9:
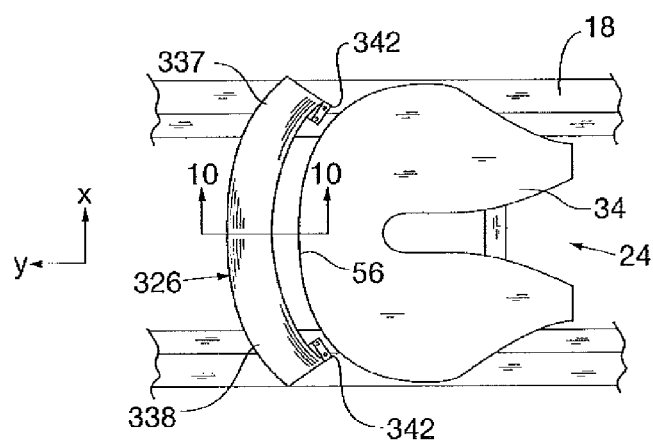
FIG. 9 is a top view of the fairing shown in FIG. 8.
Figure 10:
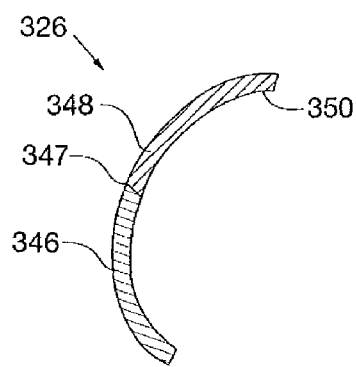
FIG. 10 is a cross-section taken along lines 10-10 of the fairing shown in FIG. 9.

FIGS. 8-10 show a fourth embodiment of a fairing 326. As shown in FIG. 8, the fairing 326 also includes a fairing base 346, a compliant portion 348, and a transition 347 there between, all of which function similarly to that described and shown above. The fairing 326 can have multiple curvatures, with two being shown. The fairing 326 has a curvilinear profile in cross section similar to that of FIG. 5, but here is convex in the forward direction and concave in the direction facing the fifth wheel 24. The fairing 326 is also curved from end to end, convex in the forward facing direction, so that fairing sides 337 and 338 (shown in FIG. 9) curve around a portion of a fifth wheel 34. The fairing sides 337, 338 can be secured to the L-shaped profile 36 and the attachment of plate 35 with bracket 342. In other embodiments, the fairing sides 337, 338 can be secured to the fifth wheel base 44. FIG. 10 shows a cross-section of fairing 326 taken along lines 10-10 of FIG. 9.

Figure 11:
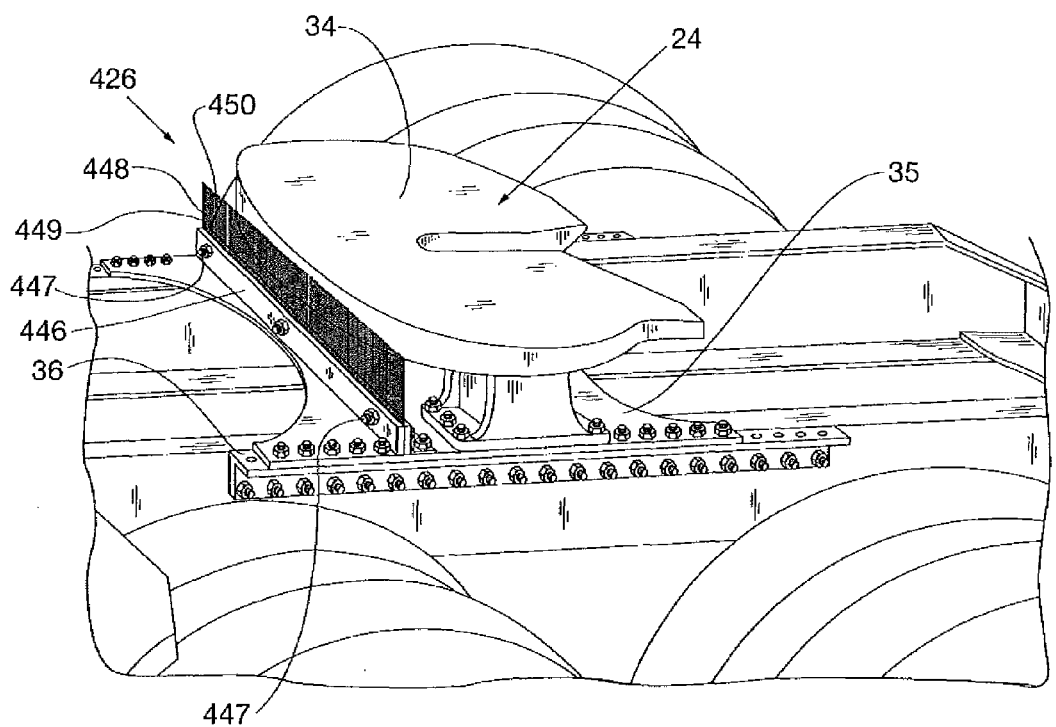
FIG. 11 is a perspective view of a tractor-trailer vehicle and fairing according to a fifth embodiment.

FIG. 11 shows a fifth embodiment of a fairing 426. Fairing 426 can be positioned forward of the fifth wheel 34 and rearward of the operator cab 16 (not shown in FIG. 11). The fairing 426 includes a fairing base 446 secured to the L-shaped profile 36, fifth wheel assembly 24 or chassis 18. A compliant portion 448 extends upwardly from the fairing base 446. The compliant portion 448 can be formed of a plurality of bristles 449 that extend upwardly from the fairing base 446. The bristles 449 can be connected to the fairing base 446 in numerous conventional ways, including sandwiched within base 446, secured on fasteners 447. Each end 450 of the bristles 449 can contact the semi-trailer underside 32 when installed. The bristles can be packed densely in the fairing base 446 to block the air flow into the cab-trailer gap. Because the bristles can be formed of flexible polymer materials or wires, the fairing 426 can flex with movement of the trailer underside during road use and with varying heights H as described above.

Figure 12:
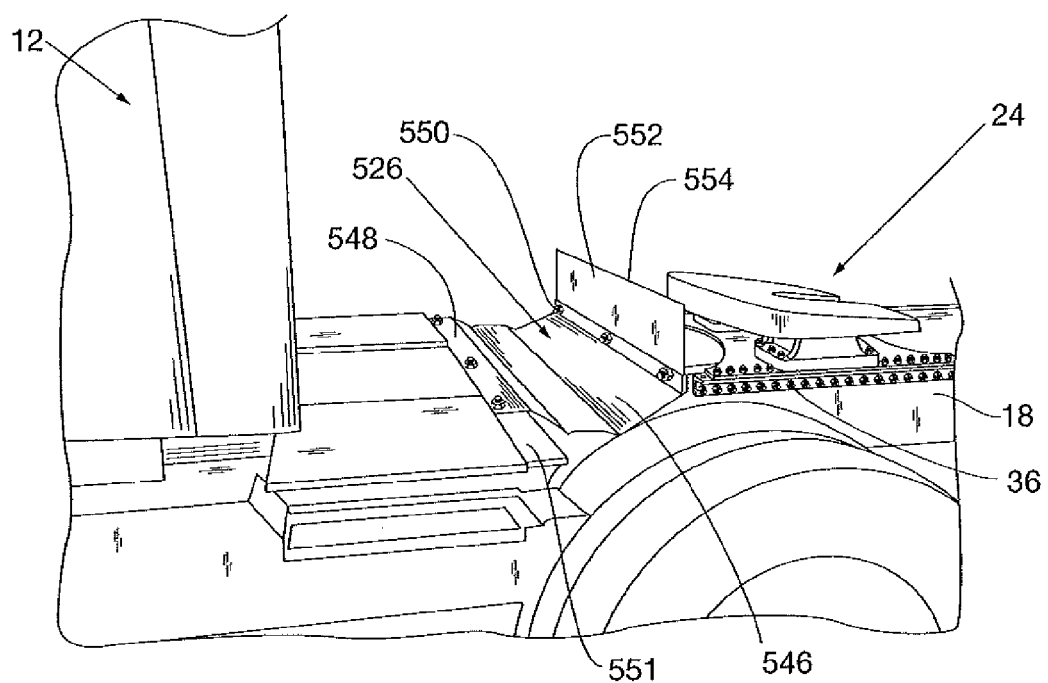
FIG. 12 is a perspective view of a tractor-trailer vehicle and fairing according to a sixth embodiment.

FIG. 12 shows a sixth embodiment of a fairing 526 in which a fairing base 546 extends longitudinally along the frame 18 to block an air flow path from beneath the truck vertically into the truck-trailer gap 28 (shown in FIG. 1). The fairing base 546 can be attached at a forward end 548 to the frame 18 or to a frame cross-member 551 (as shown) using conventional fasteners. The fairing base 546 may be attached at a rearward end 550 to the frame 18, as illustrated, or to the fifth wheel L-shaped profile 36. The fairing base 546 may have multiple bends as shown in FIG. 12 to comply with the space between the forward attachment point and the rearward attachment point. Attached to the rearward end 550 of the fairing base 546 and proximate to the fifth wheel 24 is an upstanding compliant portion 552 which may be formed as a rubber or polymer strip. A top edge 554 of the compliant portion 552 extends toward the underside 32 of the semi-trailer 14 (not shown), and operates similar to the compliant fairings as discussed above.

The above descriptions of preferred embodiments of the invention are intended to illustrate various aspects and features of the invention without limitation. Persons of ordinary skill in the art will recognize that certain changes and modifications can be made to the described embodiments without departing from the scope of the invention. All such changes and modifications are intended to be within the scope of the appended claims. Features from one embodiment or aspect may be combined with features from any other embodiment or aspect in any appropriate combination. For example, any individual or collective features of method aspects or embodiments may be applied to apparatus, product or component aspects or embodiments and vice versa.

We claim:

1. A truck for pulling a semi-trailer, the truck comprising:
    an operator cab positioned on a frame;
    a fifth wheel on the frame for receiving an underside of a semi-trailer, the semi-trailer when attached defining a gap between a forward most portion of the semi-trailer and rearward most portion of the operator cab; and
    a fairing having a generally planar shape supported by the frame and aft of the operator cab and forward of at least a portion of the fifth wheel, the fairing extending upwardly from the frame for contact with a semi-trailer when attached, the fairing at least partly blocking an air flow path into the gap from below the frame formed when a semi-trailer is attached.

2. The truck of claim 1, wherein the fairing spans at least a portion of a distance between a first wheel positioned on a first side of the frame and a second wheel positioned on the opposing side of the frame.

3. The truck of claim 1, wherein a portion of the fairing is compliant.

4. The truck of claim 1, wherein the fairing comprises a base and an upper panel, the upper panel forming an obtuse angle with respect to the base.

5. The truck of claim 4, wherein the upper panel is compliant.

6. The truck of claim 1, wherein the fairing includes a base portion mounted to the truck frame and extending longitudinally along the truck frame to a position forward of the fifth wheel and a generally planar panel extending vertically upward from the frame.

7. The truck of claim 1, wherein the fairing comprises a base and a plurality of bristles extending upwardly from the base; the bristles having an end, and at least a portion of the ends of the bristles contacting the underside of the semi-trailer when the fairing is attached to the frame.

8. A fairing for blocking air flow on a truck, the truck comprising an operator cab on a frame, a fifth wheel on the frame for receiving a semi-trailer, the semi-trailer when attached to the fifth wheel defining a gap between a forward most portion of the semi-trailer and rearward most portion of the operator cab and an airflow path into the gap from a space between a top of the frame and an underside of the semi-trailer, the fairing comprising:
    a panel supported by the frame aft of the operator cab and forward of at least a portion of the fifth wheel, the panel including a generally planar portion positioned to extend vertically in the space between the top of the frame and the underside of the semi-trailer and contact the underside of the semi-trailer when attached;
    wherein the panel at least party blocks the air flow path through the space into the gap.

9. The fairing of claim 8, wherein the fairing spans at least a portion of a distance between a first wheel positioned on a side of the frame and a second wheel positioned on the opposing side of the frame.

10. The fairing of claim 8, wherein a portion of the fairing is compliant.

11. The fairing of claim 8, wherein the fairing comprises a base with a generally planar shape and an upper panel with a generally planar shape, the upper panel forming an obtuse angle with respect to the base.

12. The fairing of claim 11, wherein the upper panel is compliant.

13. The fairing of claim 8, wherein the fairing is compliant proximate to the top edge.

14. The fairing of claim 8, wherein the fairing comprises a base and a plurality of bristles extending upwardly from the base and bristles having an end, at least a portion of the ends of the bristles contacting an underside of the semi-trailer when the semi-trailer is attached to the truck.

15. The fairing of claim 8, wherein the fairing includes a base portion mounted to the truck frame and extending longitudinally along the truck frame to a position forward of the fifth wheel and a generally planar panel extending vertically upward from the frame.

* * * * *